Patented Feb. 1, 1949

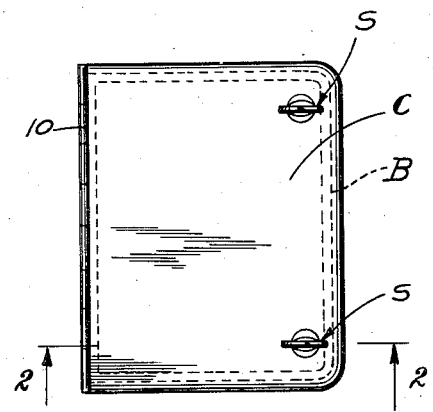
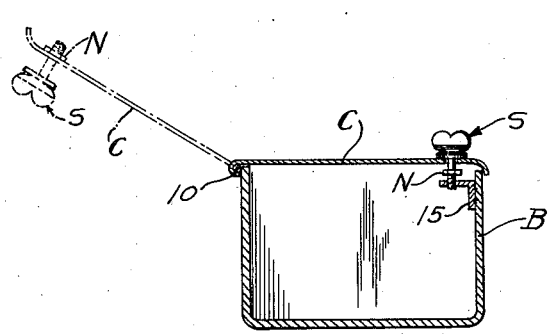
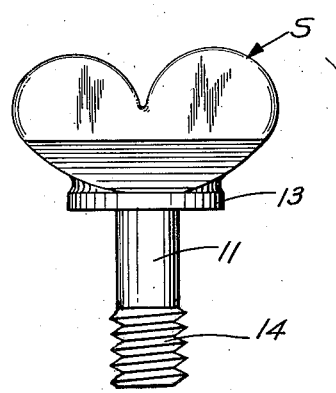
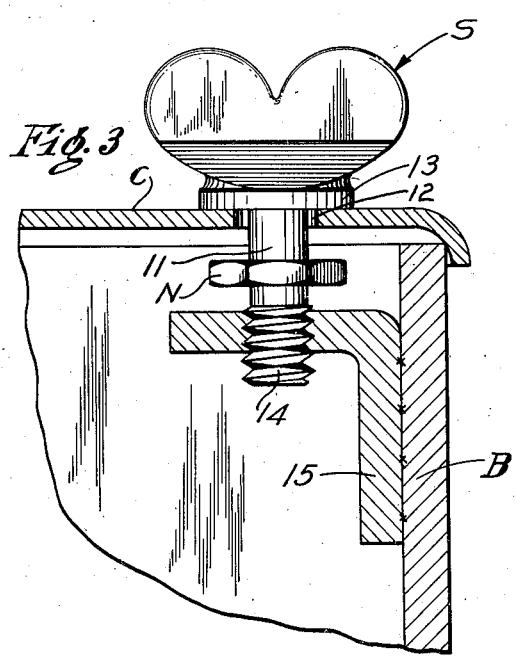
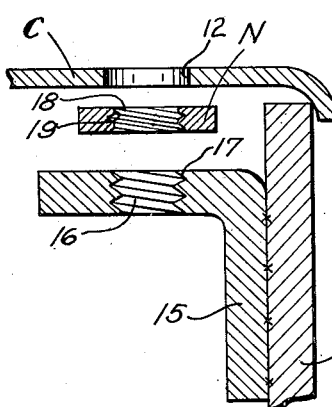

2,460,613

UNITED STATES PATENT OFFICE 2,460,613

CAPTIVE SCREW ASSEMBLY

Roderick J. Whelan and Robert A. Reich, Berea, Ohio, assignors to The Ohio Nut & Bolt Company, Berea, Ohio, a corporation of Ohio Application April 12, 1945, Serial No. 587,864

4 Claims. (Cl. 292—251)

This invention relates to captive screws, bolts and the like, and assemblies embodying such devices. In the following specification, we have described a preferred form of our invention as it may be applied to thumb screws used to secure a cover to a box. Those skilled in the art will appreciate that our invention may be applied to screws, bolts and threaded rods of various types, and in the specification and claims the term "screw" is intended to include all such threaded devices. Those skilled in the art also will appreciate that the invention is useful in other environments and for other purposes. Therefore, it is to be understood that the following description is given by way of example only, and that the invention is not limited to the precise structure illustrated and described herein.

Captive or non-losable screws are used extensively where it is desired to secure two parts together by screws and to retain the screws in one of the parts so that when the screws are released and the parts separated, the screws cannot be accidentally displaced and lost, but will always be in position in one of the parts, ready for immediate use. A typical place where such devices are used is in connection with box covers, which are secured in position by one or more screws arranged so that they cannot be accidentally displaced from the covers when the boxes are open. Devices of this general nature have been extensively used, but have been relatively expensive as compared to ordinary screws, for captive screw assemblies heretofore known have required that the shank of the screw be machined to a smaller diameter than normal, or that additional devices such as special lock washers of expensive construction be employed to prevent loss of the screw, or that the cover or part in which the screw is to be retained be deformed after the screw is assembled with it. In this last type of device, the screw is ordinarily permanently locked in the cover or other part and cannot be removed therefrom without destroying or at least substantially deforming the part.

It is accordingly a general object of the present invention to provide captive screws and captive screw assemblies in which the defects of previously known assemblies are eliminated and the objections noted above are overcome. Another object is the provision of captive screws and captive screw assemblies wherein the screws are retained against accidental displacement, but can be removed easily if desired, and which require no threading or deformation of the part in which the screw is secured and no special locking washers to secure the screws in position. Another object is the provision of captive screw assemblies in which ordinary low cost screws with rolled threads may be employed without requiring any additional machining operations on the shanks of the screws. A further object is the provision of captive screws and captive screw assemblies which can be produced and assembled at low cost as compared to prior devices. Further objects and advantages of our invention will become apparent from the following description of a preferred form thereof, reference being made to the accompanying drawings. The essential characteristics are summarized in the claims.

Referring to the drawings, in which a preferred form of the invention is illustrated, Figure 1 is a plan view of a box embodying two identical screws of our invention; Figure 2 is a cross-sectional view of the box of Figure 1 taken along the line 2—2 of Figure 1; Figure 3 is an enlarged detail of one of the screws and associated parts in assembled position; and Figure 4 is a similar view but showing the parts disassembled and illustrating the relative dimensions of the parts whereby the loss of the screw from the box cover is prevented.

As illustrated in our drawings, captive screw assemblies made according to our invention may be applied, for example, to a box B having a cover C which is secured in place by the thumb screws S, the cover being hinged to the box as at 10.

One of the captive screw assemblies is shown in detail in Figures 3 and 4. As illustrated therein the unthreaded body or shank 11 of the screw S passes through the unthreaded opening 12 in the cover, the head 13 of the screw being larger than the opening 12 and engaging the upper surface of the cover surrounding the opening 12 and the threaded portion 14 being in threaded engagement with the bracket 15 which is suitably secured, for example by welding, to the wall of the box B. The threaded opening in the bracket is indicated at 16; the relationship between the screw and the other parts is such that the threads 14 of the screw make normal threaded engagement with the threads 17 in the opening 16 of the bracket so that the cover is secured in place by connection of ample strength. The body 11 of the screw has a diameter about mid-way between the major and minor diameters of the threads 14 and passes through the opening 12 in the cover with sufficient clearance so that the screw may align itself with the threaded opening 16 in the bracket, thus the formation of the opening in the cover need not be carried out with any great degree of accuracy. The above-described parts of the assembly, therefore, can be manufactured at low cost for the screw S is an ordinary thumb screw preferably having the usual rolled threads and which does not require any special operations; the bracket 15 merely has a normally threaded opening to receive the threads of the screw, and the cover C requires nothing more than the punched opening 12 of sufficient size to freely pass the threaded portion 14 of the screw S.

In order to prevent accidental loss of the screw S when, for example, the box cover is in the open position shown in broken lines in Figure 2, a nut N is mounted on the unthreaded body of the screw as shown particularly in Figures 3 and 4. The nut N is freely slideable on the body 11 of the screw S, yet cannot be accidentally displaced therefrom. To illustrate that the nut may be moved along the body of the screw and is in now-gripping relation to members C and 15, it is shown above the upper end of the threads 14 in Figure 3, although ordinarily gravity would cause the nut to slide down into contact with the uppermost thread 14 when the assembly is in the position shown. Thus the nut will effectively prevent loss of the screw even though the box cover be inverted as shown in broken lines in Figure 2. The nut also is arranged so that it can be threaded on and off of the threads 14 of the screw without difficulty, and thus the screw can be assembled with the cover or removed therefrom with ease, without requiring any tools or any deformation of the cover.

The nut N is provided with a threaded opening 18 which has threads 19 of the same type major diameter and pitch as threads designed for normal engagement with the threaded portion 14 of the screw S. However, the threads of the nut N are truncated or flat crested as shown in the drawings to provide an opening of the required diameter to receive the body or shank 11 of the screw. Thus while the configuration, major diameter and pitch of the threads 19 are such that the nut can be readily assembled on the screw and such that the nut will slide readily on the shank of the screw, the major diameter of the threads 14 is related to the threads 19 so that the nut cannot be removed from the screw except by carefully starting the screw on the threaded portion 14 and unscrewing the nut from the screw. As the nut is larger than the opening 12 in the cover, as long as the nut is in place with the cover between the nut and the head of the screw, the screw cannot be removed from the cover and the nut, once it is screwed onto the body, is not subject to accidental displacement.

By this construction the screw S makes normal threaded engagement with the threads 17 of the bracket thus insuring ample strength in the threaded connection. The body 11 of the screw passes freely through the opening 12 in the cover so that the screw can align itself with the bracket opening without binding and so that no great accuracy is required in punching the opening in the cover. The nut N effectively prevents accidental loss of the screw, yet the parts can be assembled and disassembled whenever necessary and without tools. The assembly can be manufactured at low cost for the manufacture of the screw merely requires that the body of the screw be left unthreaded for a portion of its length in accordance with customary practice. The unthreaded portion need have no accurately controlled dimension so long as its length is at least equal to the combined thicknesses of the cover and nut. No threads are required in the cover and thus the openings 12 can be produced by punching operations which can be carried out rapidly and at very low cost.

The nut can be manufactured at extremely low cost on ordinary nut making equipment. Thin stock may be used, for about 1½ or 2 threads are sufficient. The threading operation can be carried out rapidly with standard taps, it only being necessary to punch the opening 18 of a size sufficient to clear the shank 11 and then carry out the threading operation in the usual manner, producing the desired truncated threads at low cost. The cost of the nut is substantially less than the cost of threading or deforming the cover or of providing special locking washers, as heretofore required in captive screw assemblies. The invention is particularly advantageous to the manufacturers of articles embodying captive screw assemblies, for the box manufacturer, for example, who manufactures a box embodying our captive screw assemblies does not need to carry out any threading operation or any special forming operations on the covers in order to provide the loss-proof feature.

Although we have illustrated and described in considerable detail a captive screw assembly incorporating our improved features it will be understood that variations and modifications may be made therein without departing from the spirit of our invention. We do not, therefore, wish to be limited to the specific form herein shown and described but claim as our invention all embodiments thereof coming within the scope of the appended claims.

We claim:

1. In a captive screw assembly comprising a screw and two members to be secured together, the screw having a head, a threaded end portion and an unthreaded body having a diameter substantially equal to the pitch diameter of the threads, one of said members having an opening through which the threaded portion of the screw freely can pass, the other of said members being provided with a threaded opening adapted to make normal threaded engagement with the threaded portion of the screw; the improvement which consists in providing a nut on the screw having an opening therethrough of diameter sufficiently large to permit the body to pass freely therethrough but of lesser diameter than the major diameter of the threaded end portion, the opening of the nut being threaded with threads of major diameter, pitch and configuration to permit the threaded part of the screw to be screwed therethrough, the nut normally being disposed on the body of the screw between said members when the members are assembled and the unthreaded body of the screw having a length substantially greater than the combined thickness of the nut and the member having an opening through which the threaded portion of the screw freely can pass.

2. A captive screw assembly comprising two members and a screw for securing them together, the first member having an opening through which the screw can freely pass, the second member having an opening provided with threads adapted to mate with the threads of the screw, the screw having a head, a threaded end portion and an unthreaded body of a diameter intermediate the major and minor diameters of the threaded end portion thereof, and a nut slideably mounted for longitudinal movement on said unthreaded body, said nut being disposed between said two members when said members are secured together and having a threaded opening permitting the nut to be screwed onto and off of the screw but preventing accidental displacement thereof from the screw, the length of said screw body being substantially greater than the combined thickness of said first named member and said nut.

3. In combination with a member having an opening therein, a captive screw assembly comprising a screw having a head, a threaded portion and an intermediate unthreaded portion of a diameter intermediate the major and minor diameters of said threaded portion, the major diameter of the threaded portion being less than the diameter of the opening, whereby the screw can pass freely through the opening up to the head of the screw, a nut having an opening of a slightly larger diameter than the unthreaded portion of the screw, whereby the nut may slide freely on said unthreaded portion, said opening in the nut being of lesser diameter than the major diameter of said threaded portion and having threads of major diameter, pitch and configuration to permit the threaded portion of said screw to be screwed therethrough, the length of the intermediate unthreaded portion of the screw being at least equal to the length of the threaded portion and greater than the combined thickness of the member and the nut.

4. A captive screw assembly for detachably securing two members together including in combination a screw having a head, a threaded portion having rolled threads formed thereon and an intermediate unthreaded portion of a diameter substantially equal to the pitch diameter of said thread, said intermediate unthreaded portion being disposed between the head and said threaded portion and having a length at least equal to the length of said threaded portion, and a nut having an opening of slightly larger diameter than said unthreaded portion of the screw whereby the nut may have free rotary and longitudinal movement on said unthreaded portion, said opening in the nut having a minimum diameter less than the major diameter of said threaded portion of said screw and having threads of major diameter, pitch and configuration to permit the threaded portion of said screw to be screwed therethrough, said nut being disposed on said intermediate unthreaded portion of said screw in non-gripping relation to said two members when the assembly is in use.

RODERICK J. WHELAN.
ROBERT A. REICH.

REFERENCES CITED

The following references are of record in the file of this patent:

UNITED STATES PATENTS

| Number | Name | Date |
| --- | --- | --- |
| 381,463 | Cook | Apr. 17, 1888 |
| 608,892 | Murray | Aug. 9, 1898 |
| 748,078 | Kaisling | Dec. 29, 1903 |
| 1,750,769 | Austin | Mar. 18, 1930 |
| 1,927,780 | Anderson | Sept. 19, 1933 |
| 2,010,853 | Dyer | Aug. 13, 1935 |
| 2,041,613 | Lincks | May 19, 1936 |
| 2,236,850 | Hansman | Apr. 1, 1941 |